(12) United States Patent
Aagaard

(10) Patent No.: US 7,594,355 B1
(45) Date of Patent: Sep. 29, 2009

(54) APPARATUS FOR IRRIGATING CONTAINER-GROWN PLANTS

(75) Inventor: Finn Aagaard, Algonquin, IL (US)

(73) Assignee: Midwest GROmaster, Inc., St. Charles, IL (US)

( * ) Notice: Subject to any disclaimer, the term of this patent is extended or adjusted under 35 U.S.C. 154(b) by 841 days.

(21) Appl. No.: 10/720,919

(22) Filed: Nov. 24, 2003

(51) Int. Cl.
*A01G 9/24* (2006.01)

(52) U.S. Cl. ............ 47/1.01 R; 47/17; 47/18

(58) Field of Classification Search .......... 47/48.5, 47/1.01 R, 17, 18
See application file for complete search history.

(56) References Cited

U.S. PATENT DOCUMENTS

| | | | | |
|---|---|---|---|---|
| 762,014 | A | * | 6/1904 | Wittbold ............... 47/18 |
| 1,939,015 | A | * | 12/1933 | McLellan ............... 47/17 |
| 3,807,088 | A | | 4/1974 | Jones |
| 3,925,926 | A | | 12/1975 | Shigeo |
| 4,045,909 | A | | 9/1977 | Moss |
| 4,107,875 | A | | 8/1978 | Bordine |
| 4,211,037 | A | | 7/1980 | Green |
| 5,133,151 | A | | 7/1992 | Blok |
| 5,189,834 | A | | 3/1993 | Green |
| 5,252,108 | A | | 10/1993 | Banks |
| 5,355,618 | A | * | 10/1994 | Pedersen ............... 47/18 |
| 5,826,374 | A | | 10/1998 | Baca |
| 5,887,383 | A | | 3/1999 | Soeda |
| 6,295,759 | B1 | | 10/2001 | Malone et al. |
| 2001/0047617 | A1 | | 12/2001 | Blossom |

OTHER PUBLICATIONS

Midwest GROmaster, Inc.: Technical Sheets labeled as; Internet Archive Wayback Machine, "plumbing for EBB-FLO" (1 and 2 of 2), "retrofitbar", "tanks", "pumps", "quick valve", and "smallinject". www.midgro.com.*

Midwest GROWmaster, Inc,; Technical Sheets Labeled As; Internet Archive Wayback Machine; Plumbing for EBB-FLO (1 of 2 and 2); Retrofit Bar; Tanks; Pump; Quick Valve; Smallinject;www.midgrow.com.*

* cited by examiner

*Primary Examiner*—Francis T Palo
(74) *Attorney, Agent, or Firm*—Mathew R. P. Perrone, Jr.; Bric A. Crawford

(57) ABSTRACT

A mobile apparatus for irrigating container-grown plants suitable for use as a nursery irrigation system has a remote water storage tank, which utilizes the same overhead pipe to deliver and remove the water to a plant tray to base of the plant without contacting the leaves of the plant under an automatically controlled system.

19 Claims, 3 Drawing Sheets

APPARATUS FOR IRRIGATING CONTAINER-GROWN PLANTS

This invention relates to an irrigation system for container grown plants in a nursery, and more particularly an irrigation system that is mobile, uses one pipe for the delivery and removal of the water, while avoiding imbedded floor plumbing.

BACKGROUND OF THE INVENTION

In plant nurseries, it is necessary to water the plants on a daily basis. The best method for watering plants is by providing water to the root ball from below, thereby avoiding wetting the plant leaves. Wet leaves may lead to leaf fungus. Leaf fungus, of course, is a major problem in the industry and is best prevented, rather than remedied. Prevention of this problem is preferred, because it is environmentally friendly and efficient.

Many watering systems are known that provide water to a tray within which the plants sit, thereby watering the root ball from below. However, these systems require fixed plumbing in the floor or the location of a large water tank next to the plant tray. The existing systems also require separate pipes to deliver and remove the water.

Fixed plumbing for watering plants from below creates a problem for the flexibility of the space involved in supporting the plants. For example, some nurseries desire to remove tables and use the space for Christmas trees. The use of extensive fixed plumbing or water storage tanks limits the usability of the floor space in a nursery. Floor space is almost always at a premium in the nursery business.

Such a fixed system also makes the inventory process more difficult, as a fork lift or other equipment must be maneuvered around the fixed floor pipes and water tanks. The existing watering systems for plants further require manual operation, which adds to the cost of operation.

Clearly, automation of the system and recycling of the water can lead to great efficiency. Yet, such a watering system is lacking for the plant nurseries of today. With natural resources in short supply, it is best to conserve whenever possible.

SUMMARY OF THE INVENTION

Among the many objectives of the present invention is the provision of a nursery irrigation system that requires no fixed floor plumbing.

A further objective of this invention is the provision of a nursery irrigation system that has one pipe to deliver and remove water from the plant tray.

Yet a further objective of this invention is the provision of an irrigation system that allows the water storage tank to be remotely located from the plant tray.

A still further objective of this invention is the provision of a nursery irrigation system that can be easily disassembled and reconfigured to allow the maximum and flexible use of the selling floor space in a nursery.

Another objective of this invention is the provision of an irrigation system that can be automatically controlled, allowing unattended system operation.

These and other objectives of the invention (which other objectives become clear by consideration of the specification, claims and drawings as a whole) are met by providing a mobile apparatus for irrigating container-grown plants suitable for use as a nursery irrigation system with a remote water storage tank, that utilizes the same overhead pipe to deliver and remove the water under an automatically controlled system.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

The mobile apparatus for irrigating container-grown plants from below the root ball, or from the bottom of the container or the tray holding the plants, has a water storage tank. The tank can be remotely located away from the plant trays and can service multiple plant trays. Overhead piping connects the tank to the plant trays. In a preferred form, the water storage tank may be located in a back room, away from the main selling floor.

The mobile irrigation apparatus uses a centrifugal pump to deliver water to the multiple plant trays and a venturi vacuum pump to remove the water from the trays. Each individual plant tray has an input pipe with a solenoid valve that can be electrically controlled, allowing for timed or remote control of the system. The delivery and drain piping of the system is located overhead and close to the ceiling, thereby facilitating more flexible uses of the selling floor and allowing easy rearrangement of the plant trays, by removing and reattaching the plant tray piping system.

The preferred material for the piping on the irrigation system is rigid Polyvinyl Chloride (PVC), but any other suitable piping rigid material, such as copper, steel or aluminum may be used. Rigid PVC provides superior results because it is lightweight but prevents pooling that can occur with the sagging of a flexible pipe.

Figure 1:
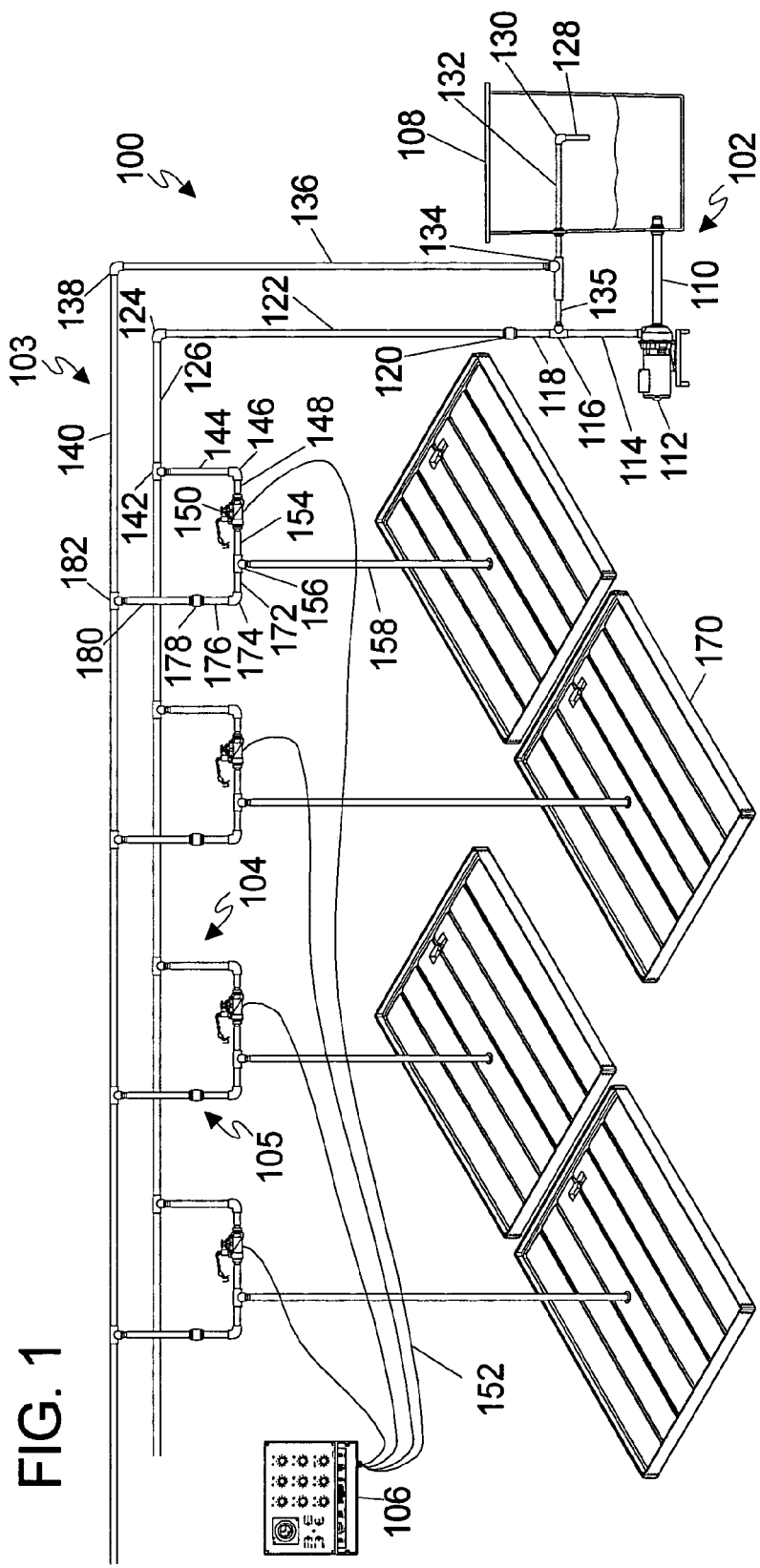
FIG. 1 depicts a perspective view of the mobile nursery irrigation system 100 of this invention.

Referring now to FIG. 1, the ease of adding and removing plant trays from the system is readily apparent. The mobile nursery irrigation system 100 is composed of five main parts, a main delivery assembly 102; a main drain assembly 103; a tray delivery assembly 104; a tray drain assembly 105; and a controller 106.

The main delivery assembly 102 has a storage tank 108 connected to outflow pipe 110, which feeds into centrifugal pump 112. The output from centrifugal pump 112 flows into through the centrifugal pump output pipe 114 into the main delivery pipe tee 116.

Joined to the vertical end of the main delivery pipe tee 116 is check valve flow inflow pipe 118, which is attached to main delivery check valve 120. The outflow from main delivery check valve 120 flows into main delivery ascending pipe 122, through main delivery elbow 124 into main delivery pipe 126, where connections to each individual tray delivery assembly 104 are made. Main delivery check valve 120 prevents backflow from the main delivery ascending pipe 122 into water storage tank 108.

Multiple tray drain assembly 105 are attached to main drain assembly 103. Main drain assembly 103 consists of main drain pipe 140, which feeds into main drain elbow 138 which is connected to main drain descending pipe 136. Main drain descending pipe 136 feeds into the vertical opening of venturi vacuum pump 134.

Connecting into one horizontal opening of venturi vacuum pump 134 is the delivery/drain interconnection pipe 135, and connecting into the other horizontal opening is tank input pipe 132. Water flows through tank input pipe 132 into tank elbow 130 and to tank input vertical pipe 128, from where it flows into storage tank 108. The delivery or drain interconnection pipe 135 allows water to flow from the main water drain assembly 102 into the inlet of the venturi vacuum pump 134, thereby providing the motive flow to create the vacuum necessary to remove the water from the plant trays 170.

Each tray delivery assembly 104 has a tray delivery input tee 142 which tees off of main delivery pipe 126. The vertical opening of tray delivery input tee 142 is connected to tray delivery input pipe 144, which is further connected to tray delivery input elbow 146. Attached to the other opening of tray delivery input elbow 146 is tray delivery input pipe extension 148, which connects the input side of to tray delivery solenoid valve 150.

Connected to the output side of tray delivery solenoid valve 150 is solenoid valve pipe extension 154, which is further connected to one of the horizontal openings of tray pipe tee 156. Attached to the vertical opening of tray pipe tee 156 is tray vertical pipe 158 leading to a plant tray 170.

Figure 2:
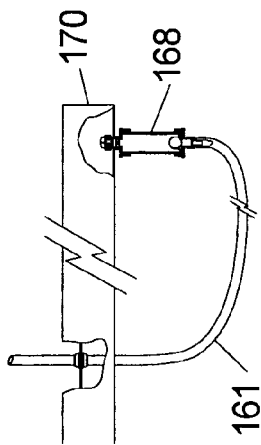
FIG. 2 depicts a view of tray assembly for the delivery and draining of water according to an embodiment of the present invention.

Adding FIG. 2 to the consideration, tray vertical pipe 158 is connected to tray flexible hose 161. Tray flexible hose is connected to vacuum shut off valve 168. Vacuum shut off valve 168 is connected to plant tray 170. Vacuum shut off valve 168 acts under positive pressure from the centrifugal pump 112 to allow water to flow on to the plant tray 170. When under vacuum from venturi vacuum pump 134, the vacuum shut off valve 168 allows water to flow freely from the plant tray 170 back to the flexible hose 161 through the drain system 103, until there is no water remaining on the plant tray 170. When no water remains, the vacuum shut off valve 168 closes, thereby maintaining the vacuum in the drain system 103.

Referring back to FIG. 1, attached to the other horizontal opening of tray pipe tee 156 is tray drain assembly 105 and tray drain extension pipe 172 in particular. Tray drain extension pipe 172 is further connected to train drain elbow 174, which is attached to tray drain check valve input pipe 176. The other end of tray drain check valve input pipe 176 is attached to tray drain check valve 178. The output of tray drain check valve feeds into tray drain pipe 180, which is attached to tray drain tee 182. Tray drain tee 182 tees into main drain assembly 103 in general and main drain pipe 140 in particular.

Tray drain check valve 178 prevents back flow from the main water drain assembly 103 into plant tray 170. Connected to the solenoid valve control wires 152 is controller 106. Controller 106 includes a timing mechanism to allow for timed and remote control of the system. Thus, watering or irrigation times may be easily set.

Figure 3:
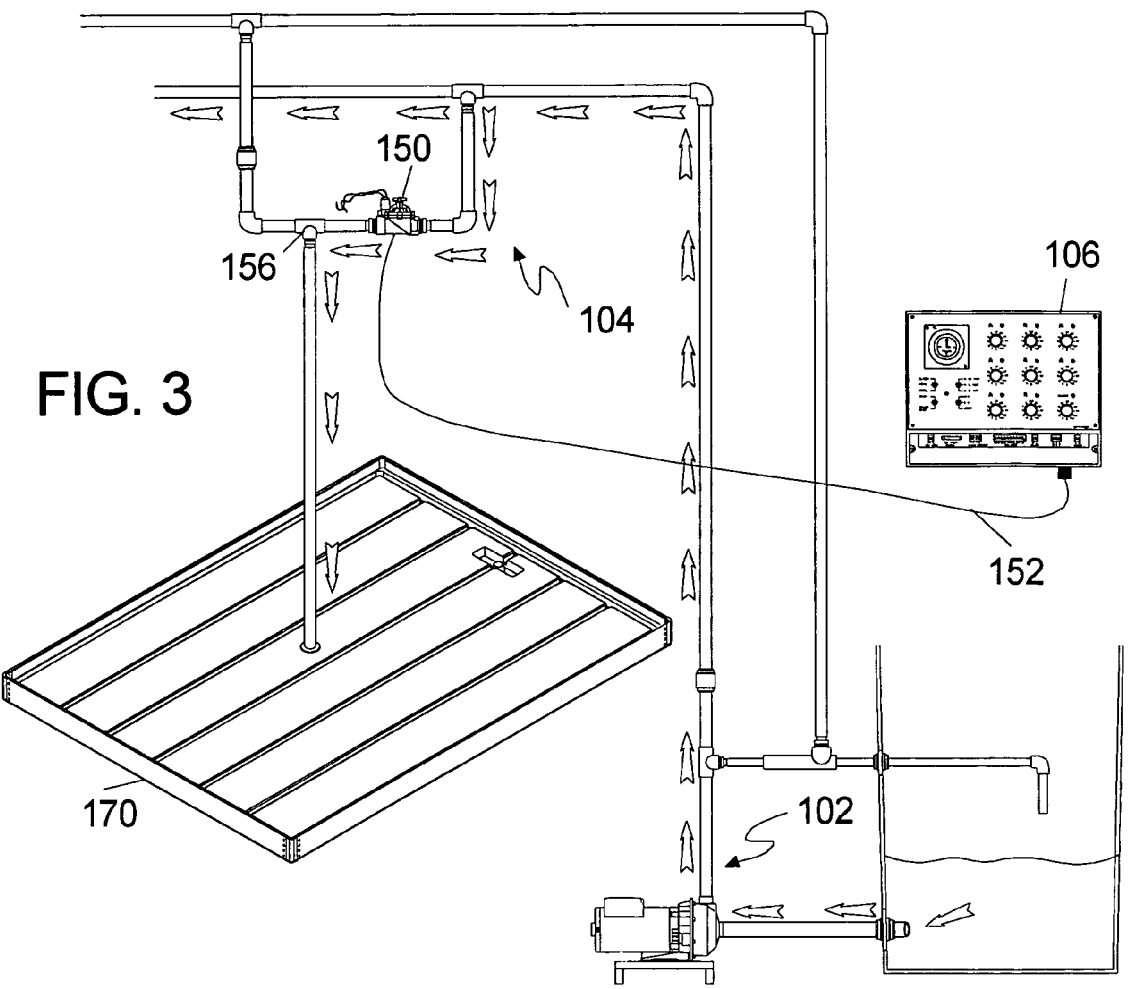
FIG. 3 depicts a view of system 100 showing the flow of water through the apparatus for the delivery of water to a tray of the present invention.

Turning now to FIG. 3, with controller 106 connected to the tray delivery solenoid valve 150 by solenoid valve control wires 152, water can be delivered through main delivery assembly 102 to tray delivery assembly 104, and in particular through tray pipe tee 156, to a plant tray 170. Thus, water flow to the plant tray 170 is controlled properly.

Figure 4:
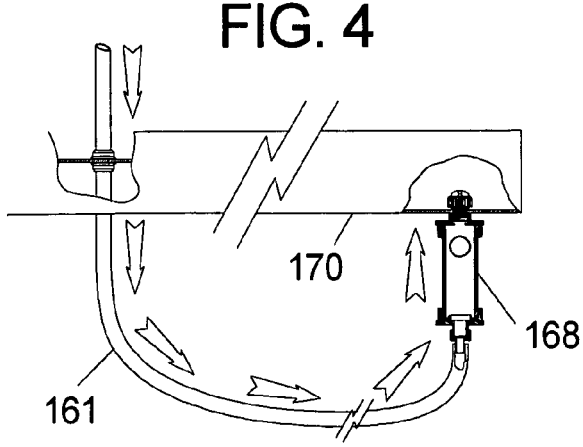
FIG. 4 depicts a view of components found underneath a plant tray 170 showing the flow of water for the delivery of water to a plant tray of the present invention.

Adding FIG. 4 to the consideration, water flows through tray flexible hose 161 into vacuum shut off valve 168 and then into the plant tray 170. In this fashion, water to each plant tray 170 is controlled.

Figure 5:
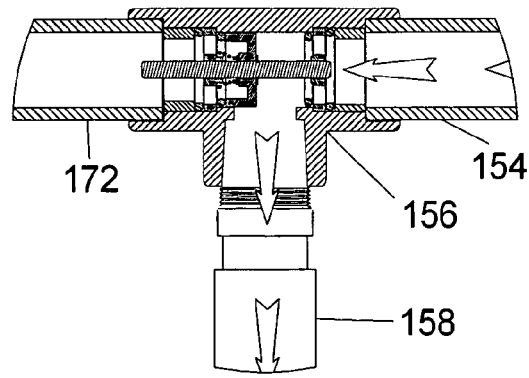
FIG. 5 depicts a perspective view of tray pipe tee 156 showing the flow of water through the tee from solenoid valve pipe extension 154 to tray vertical pipe 158 for delivery of water to a plant tray 170 of the present invention.

Adding FIG. 5 to the consideration, the operation of tray pipe tee 156 diverts water from solenoid valve pipe extension 154 into tray vertical pipe 158 to allow the delivery of water to plant tray 170. Such a diversion provides a good control of the water flow thanks to tray delivery solenoid valve 150.

Figure 6:
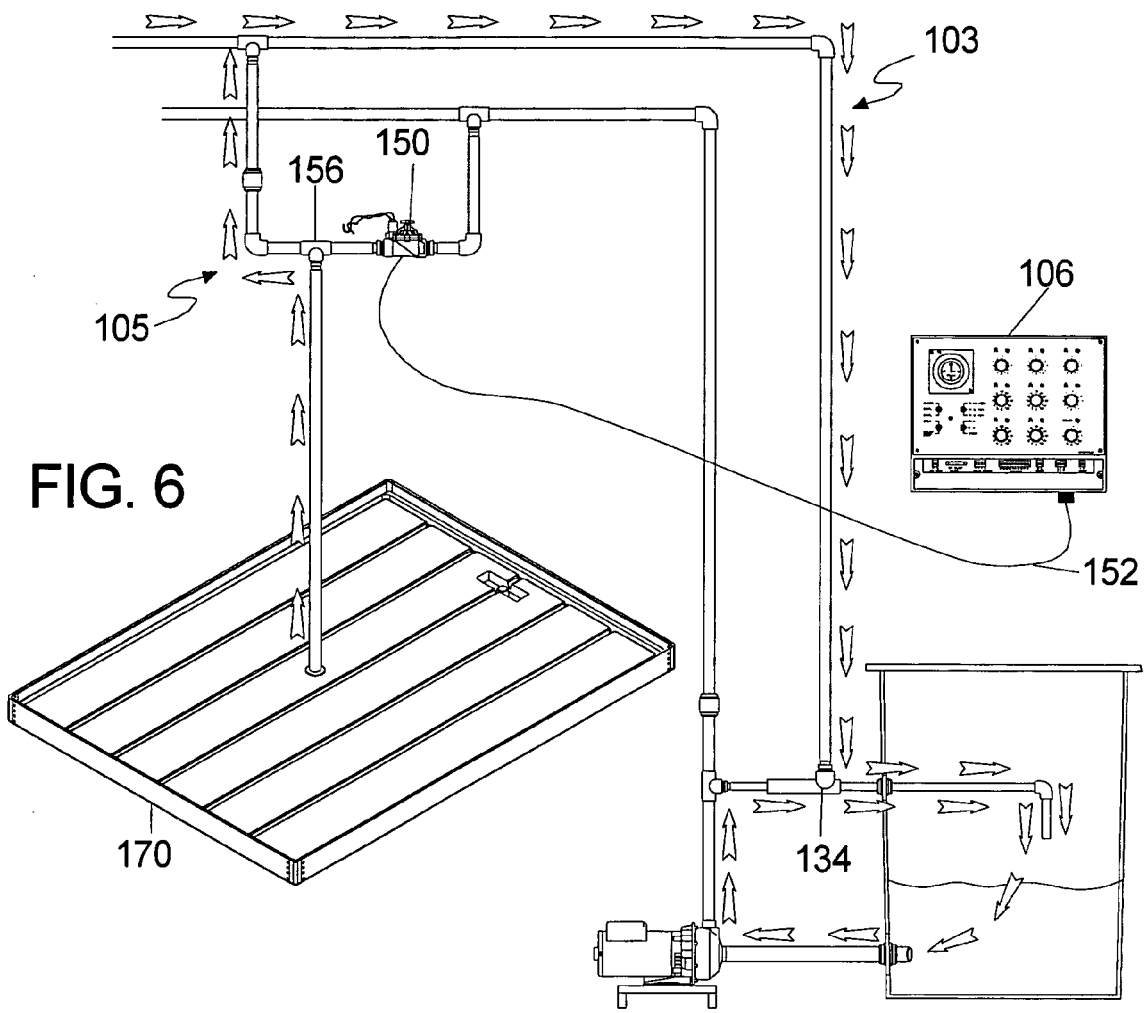
FIG. 6 depicts a view of apparatus 100 showing the flow of water through the apparatus for the drainage of water from a plant tray 170 of the present invention.

Turning now to FIG. 6, venturi vacuum pump 134 brings about the flow of water from the plant tray 170 through tray pipe tee 156 of tray drain assembly 105 into main drain assembly 103 of the present invention for the purpose of draining a plant tray 170. The flow of water is shown away from plant tray 170 back to tank 108 (FIG. 1).

Figure 7:
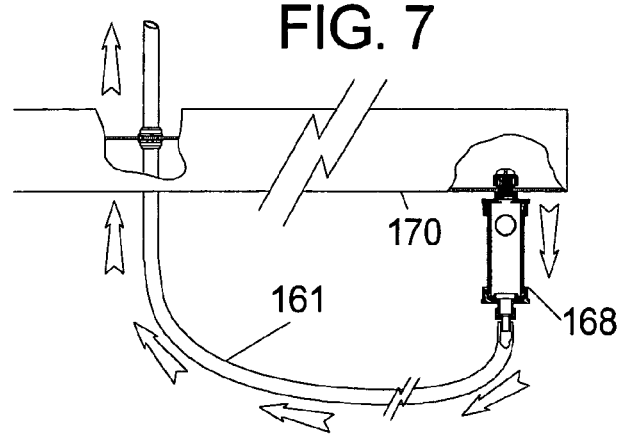
FIG. 7 depicts a view of the components found under a plant tray 170 showing the flow of water for the drainage of water from a plant tray 170 of the present invention.

Adding FIG. 7 to the consideration, the operation of positive pressure ball valve can be seen to effectuate the draining of water plant tray 170 into tray flexible hose 161. Again, the flow of water is shown away from plant tray 170 back to tank 108 (FIG. 1).

Figure 8:
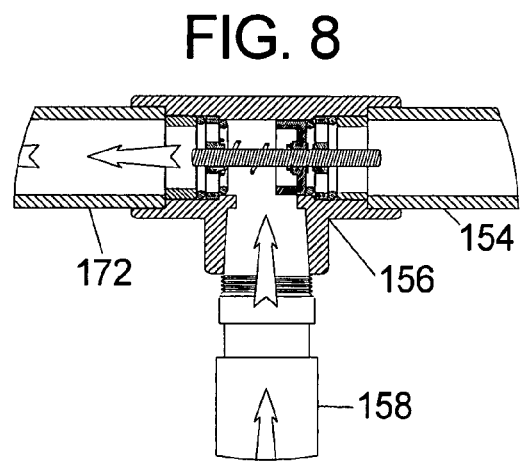
FIG. 8 depicts a view of tray pipe tee 156 showing the flow of water through the tee from tray vertical pipe 158 to tray drain extension pipe 172 for drainage of water from a tray of the present invention.

Adding FIG. 8 to the consideration, the flow of water through tray pipe tee 156 is shown in the drainage of water from tray vertical pipe 158 to tray drain extension pipe 172. Clearly reemphasized such a diversion provides a good control of the water flow thanks to tray delivery solenoid valve 150 (FIG. 1).

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A nursery irrigating system comprising:
   (a) a remotely placed water storage tank connected to at least one plant tray with an overhead pipe system;
   (b) the overhead pipe system having a main delivery pipe connected to the at least one plant tray in order to deliver to at least one root ball of at least one plant in the at least one plant tray without direct water contact with any leaf of the at least one plant and remove water from the at least one plant tray;
   (c) the nursery irrigating system being easily disassembled and reconfigured;
   (d) a controller allowing for unattended system operation;

(e) the remotely placed water storage tank having the delivery pipe connected to a centrifugal pump;
(f) the centrifugal pump providing force to move water into the overhead pipe system; and
(g) a check valve being mounted between the overhead pipe system and the at least one plant tray in order to avoid a back flow of water into the remotely placed water storage tank.

2. The nursery irrigation system of claim 1 further comprising:
(a) a venturi vacuum pump to remove water also connected to the main delivery pipe;
(b) the overhead pipe system having an ascending pipe connected between the main delivery pipe and the venturi vacuum pump;
(c) the ascending pipe being connected between the main delivery pipe and the centrifugal pump;
(d) the main delivery pipe being connected to a tray delivery assembly;
(e) the tray delivery system feeding a supply of water to the at least one plant tray at the root ball of the at least one plant contained in the at least one plant tray from below the at least one plant tray; and
(f) the tray delivery system removing the supply of water from the at least one plant tray.

3. The nursery irrigation system of claim 2 further comprising the check valve being mounted on the ascending pipe to prevent water from backflowing from the overhead pipe system into the storage tank.

4. The nursery irrigation system of claim 3 further comprising at least one tee line in the main delivery pipe that feed water to the tray delivery assembly in order to furnish water to each of the at least one plant in a plant tray.

5. The nursery irrigation system of claim 4 further comprising a solenoid valve for the controller in the tray delivery assembly which can be remotely controlled in order to initiate or terminate the supply of water to the plant tray.

6. The nursery irrigation system of claim 5 further comprising:
(a) the solenoid valve connecting to the tray delivery assembly;
(b) the controller including the solenoid valve attached to a timer in order to allow for timed operation of the initiation and termination of the supply of water to the plant tray; and
(c) the controller providing timed control of the flow to and removal of water from the plant table.

7. The nursery irrigation system of claim 6 further comprising:
(a) the venturi vacuum pump removing water from the plant tray;
(b) the tray delivery assembly including a tray drain assembly connected to a main drain assembly and into the storage tank;
(c) the main drain assembly being connected to the main delivery pipe; and
(d) the venturi vacuum pump sending water through the tray drain assembly into the main drain assembly on a return to the storage tank.

8. The nursery irrigation system of claim 7 further comprising a vacuum shut off valve cooperating with the centrifugal pump to allow water to flow on to the plant tray at the root ball and cooperating with the venturi vacuum pump to allow water to flow from the plant tray.

9. The nursery irrigation system of claim 8 further comprising an input line connecting the delivery pipe into the water storage tank.

10. The nursery irrigation system of claim 9 further comprising the controller having up to 60 timers each of the up to 60 timers being connected to a separate member in a group of the solenoid valve to have timed control of the flow and removal of water from the plant table.

11. The nursery irrigation system of claim 10 further comprising the tray drain assembly being easily disconnected from the main drain assembly and readily disassembled and reassembled.

12. The nursery irrigation system of claim 11 further comprising the tray delivery assembly being easily disconnected from the main delivery assembly and easily disassembled and reassembled.

13. The nursery irrigation system of claim 12 further comprising a main delivery assembly being easily disassembled and reassembled.

14. A nursery irrigating system adapted to feed water to at least one root ball of at least one plant in at least one plant tray comprising:
a remotely placed water storage tank connected to at least one plant tray with an overhead pipe system;
the overhead pipe system having a main delivery pipe to deliver and remove water from the at least one plant tray;
the nursery irrigating system being easily disassembled and reconfigured;
a controller allowing for an unattended operation of the overhead pipe system;
the remotely placed water storage tank having the delivery pipe connected to a centrifugal pump; and
the centrifugal pump providing force to move water into the overhead pipe system;
a venturi vacuum pump to remove water also connected to the main delivery pipe;
the overhead pipe system having an ascending pipe connected between the main delivery pipe and the venturi vacuum pump;
the ascending pipe being connected between the main delivery pipe and the centrifugal pump;
the main delivery pipe being connected to a tray delivery assembly;
the tray delivery system feeding a supply of water through the main delivery pipe to the at least one plant tray at the root ball of at the least one plant contained in the at least one plant tray from below the at least one plant; and
the tray delivery system removing the supply of water from the at least one plant tray through the main delivery pipe.

15. The nursery irrigation system of claim 14 further comprising a check valve mounted on the ascending pipe to prevent water from backflowing from the overhead pipe system into the storage tank.

16. The nursery irrigation system of claim 15 further comprising at least one tee line in the main delivery pipe that feed water to the tray delivery assembly in order to furnish water to each of the at least one plant in a plant tray.

17. The nursery irrigation system of claim 16 further comprising a solenoid valve for the controller in the tray delivery assembly which can be remotely controlled and in order to initiate or terminate the supply of water to the plant tray.

18. The nursery irrigation system of claim 17 further comprising:
the solenoid valve being connected to the tray delivery assembly;
the controller including the solenoid valve attached to a timer in order to allow for timed operation of the initiation and termination of the supply of water to the plant tray;

the controller providing timed control of the flow to and removal of water to the plant table;

the venturi vacuum pump removing water from the plant tray;

the tray delivery assembly including a tray drain assembly connected to a main drain assembly and into the storage tank;

the main drain assembly being connected to the main delivery pipe; and the venturi vacuum pump sending water through the tray drain assembly into the main drain assembly on a return to the storage tank.

19. The nursery irrigation system of claim 7 further comprising:

a vacuum shut off valve cooperating with the centrifugal pump to allow water to flow on to the plant tray at the root ball and cooperating with the venturi vacuum pump to allow water to flow from the plant tray;

a check valve in the main delivery pipe preventing a backflow of water from the main drain pipe into the tray drain assembly;

an input line connecting the main drain line to the water storage tank;

the controller having up to 60 timers each of the up to 60 timers being connected to a separate member in a group of the solenoid valve to have timed control of the flow and removal of water from the plant table;

the tray drain assembly being easily disconnected from the main drain assembly and readily disassembled and reassembled;

the tray delivery assembly being easily disconnected from the main delivery assembly and easily disassembled and reassembled; and the main delivery assembly being easily disassembled and reassembled.

* * * * *